US007599102B2

(12) United States Patent
Doi et al.

(10) Patent No.: US 7,599,102 B2
(45) Date of Patent: Oct. 6, 2009

(54) IMAGE FORMING APPARATUS AND IMAGE STABILIZATION PROCESSING METHOD FOR IMAGE FORMING DEVICE IN SAID IMAGE FORMING APPARATUS

(75) Inventors: Takahiro Doi, Toyokawa (JP); Masazumi Ito, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 915 days.

(21) Appl. No.: 11/011,086

(22) Filed: Dec. 15, 2004

(65) Prior Publication Data

US 2005/0219662 A1 Oct. 6, 2005

(30) Foreign Application Priority Data

Mar. 30, 2004 (JP) ............................ 2004-100174

(51) Int. Cl.
*H04N 1/04* (2006.01)

(52) U.S. Cl. ....................... 358/474; 358/496; 358/497; 358/498

(58) Field of Classification Search ................. 358/474, 358/496, 497, 498, 1.3
See application file for complete search history.

(56) References Cited

FOREIGN PATENT DOCUMENTS

| | | |
|---|---|---|
| JP | 7-20669 | 1/1995 |
| JP | 07-064452 | 3/1995 |
| JP | 09-258637 | 10/1997 |
| JP | 2003-167394 | 6/2003 |

OTHER PUBLICATIONS

A Notification of Reasons for Refusal issued in corresponding Japanese Patent Application No. 2004-100174, and translation thereof, Dated: Nov. 17, 2006.

*Primary Examiner*—Houshang Safaipour
(74) *Attorney, Agent, or Firm*—Buchanan Ingersoll & Rooney PC

(57) ABSTRACT

An image forming apparatus includes an image creation device loaded in the image forming apparatus in a replaceable manner, an openable and closable cover to be opened and closed when the image creation device is to be replaced with a new one, a new/old discrimination portion that discriminates whether the image creation device is new or old, an image stabilization processing portion that executes image stabilization processing for old image creation devices to maintain image quality with respect to old image creation devices and executes image stabilization processing for brand-new image creation devices including a part of the image stabilization processing for old image creation devices as common-processing to maintain image quality with respect to brand-new image creation devices, and a controller. The controller makes the new/old discrimination portion initiate new/old discrimination processing at the time of turning on power supply and/or closing the openable and closable cover, makes the image stabilization processing initiate common-processing common to image stabilization processing for old image creation devices and that for brand-new image creation devices, and makes the image stabilization processing initiate image stabilization processing peculiar to brand-new image creation devices or old image creation devices depending on a discrimination result of the new/old discrimination portion after completion of the common-processing.

14 Claims, 7 Drawing Sheets

IMAGE FORMING APPARATUS AND IMAGE STABILIZATION PROCESSING METHOD FOR IMAGE FORMING DEVICE IN SAID IMAGE FORMING APPARATUS

This application claims priority under 35 U.S.C. § 119 to Japanese Patent Applications No. 2004-100174 filed on Mar. 30, 2004, the entire disclosure of which is incorporated herein by reference in its entirety.

BACKGROUND OF THE INVENTION

1. Field of the Invention

The present invention relates to an image forming apparatus to be applied to, e.g., copying machines, printers, facsimiles, or multi-function peripherals having a copying function, a printer function and a facsimile function. It also relates to an image stabilizing processing method for an image forming device loaded in the image forming apparatus in a replaceable manner.

2. Description of Related Art

The following description sets forth the inventor's knowledge of related art and problems therein and should not be construed as an admission of knowledge in the prior art.

In the aforementioned image forming apparatuses, an image creation device unit integrally provided with an electrophotography photosensitive drum and various devices, e.g., a developing device and a charging device, arranged around the drum is loaded in an exchangeable manner.

In order to maintain the image quality of the image creation device, it is configured to execute image stabilization processing every time the power supply of the image forming apparatus is turned on and/or every time the image creating device is replaced with a new one.

Such image stabilization processing includes common-processing common to both a brand-new image creation device (hereinafter may be simply referred to as "new device") and a current image creation device which has been already loaded and currently used (hereinafter may be simply referred to as "old device") and processing peculiar to such new devices or old devices. Furthermore, in some cases, both of all the image stabilization processing for new and old devices are common-processing, and no image stabilizing processing peculiar to old devices exists.

Accordingly, when the power source of the image forming apparatus is turned on or the image creation device is replaced with a new one, it is discriminated whether the image creation device is new or old. Conventionally, before discriminating whether the image creation device is new or old, image stabilization processing for old devices is initiated. Furthermore, even if it is discriminated that the device is new, after completion of the image stabilization processing for old devices, all of the image stabilization processing for new devices including common-processing common to old and new devices will be also executed from the beginning.

Japanese Unexamined Laid-open Patent Publication No. 7-64452 discloses that it is discriminated whether a developing cartridge is old or new and that processing to be executed to the developing cartridge is changed depending on the discrimination result.

Furthermore, Japanese Unexamined Laid-open Patent Publication No. 9-258637 discloses that it is discriminated whether a process cartridge is in a rather new condition or in a rather used condition and that the contents of processing are changed depending on the discrimination result to prevent fluctuation of a print line width.

As mentioned above, however, in cases where it is discriminated that an image creation device is new, although the common-processing common to new and old devices had been already executed by the initially executed image stabilization processing for old devices, all of the processing including the common-processing will be also executed when the image stabilization processing for new devices is executed. Therefore, the efficiency was poor and it took a time to complete the image stabilization processing.

The aforementioned Japanese publications completely fail to disclose, or even recognize, the aforementioned problems and/or solution thereof.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an image forming apparatus capable of efficiently executing image stabilization processing for an image creation device in a short time.

Among other potential advantages, some embodiments can provide an image stabilization processing method for an image creation device loaded in an image forming apparatus, capable of efficiently executing image stabilization processing for the image creation device in a short time.

According to a first aspect of the preferred embodiment of the present invention, an image forming apparatus, comprises:

- an image creation device loaded in the image forming apparatus in a replaceable manner;
- an openable and closable cover configured to be opened and closed when the image creation device is to be replaced with a new one;
- a new/old discrimination device that discriminates whether the image creation device is a brand-new image creation device or an old image creation device which has been already loaded and used;
- an image stabilization processing portion that executes image stabilization processing for old image creation devices to maintain image quality with respect to old image creation devices and also executes image stabilization processing for brand-new image creation devices including a part of the image stabilization processing for old image creation devices as common-processing to maintain image quality with respect to brand-new image creation devices; and
- a controller that makes the new/old discrimination portion initiate new/old discrimination processing when power supply is turned on and/or the openable and closable cover is closed, makes the image stabilization processing portion initiate common-processing common to image stabilization processing for old image creation devices and image stabilization processing for brand-new image creation devices before it is discriminated that the image creation device is a brand-new image creation device or an old image creation device, and makes the image stabilization processing portion initiate image stabilization processing peculiar to brand-new image creation devices or old image creation devices depending on a discrimination result of the new/old discrimination portion after completion of the common-processing.

According to a second aspect of the preferred embodiment of the present invention, an image forming apparatus, comprises:

an image creation device loaded in the image forming apparatus in a replaceable manner;

an openable and closable cover configured to be opened and closed when the image creation device is to be replaced with a new one;

a new/old discrimination device that discriminates whether the image creation device is a brand-new image creation device or an old image creation device which has been already loaded and used;

an image stabilization processing portion that executes image stabilization processing for old image creation devices to maintain image quality with respect to old image creation devices and executes image stabilization processing for brand-new image creation devices including all of the image stabilization processing for old image creation devices as common-processing and image stabilization processing peculiar to brand-new image creation devices to maintain image quality with respect to brand-new image creation devices; and a controller that makes the new/old discrimination portion initiate new/old discrimination processing when power supply is turned on and/or the openable and closable cover is closed, makes the image stabilization processing portion initiate the image stabilization processing for old image creation devices as the common-processing before it is discriminated that the image creation device is a brand-new image creation device or an old image creation device, and makes the image stabilization processing portion execute the image stabilization processing peculiar to brand-new image creation devices after completion of the image stabilization processing for old image creation devices in cases where it is discriminated that the image creation device is a brand-new image creation device.

According to a third aspect of the preferred embodiment of the present invention, an image stabilization processing method for an image creation device loaded in an image forming apparatus, comprises the steps of:

initiating new/old discrimination processing for discriminating whether the image creation device is a brand-new image creation device or an old image creation device which has been already loaded and used when power supply is turned on and/or an openable and closable cover to be opened or closed at the time of replacing the image creation device loaded in a replaceable manner is closed;

initiating common-processing common to image stabilization processing for old image creation devices to maintain image quality with respect to old image creation devices and image stabilization processing for brand-new image creation devices to maintain image quality with respect to the brand-new image creation device before it is discriminated that the image creation device is a brand-new image creation device or an old image creation device; and executing image stabilization processing peculiar to brand-new image creation devices or old image creation devices depending on a discrimination result after completion of the common-processing.

According to a fourth aspect of the preferred embodiment of the present invention, an image stabilization processing method for an image creation device loaded in an image forming apparatus, comprises the steps of:

initiating new/old discrimination processing for discriminating whether the image creation device is a brand-new image creation device or an old image creation device which has been already loaded and used when a power supply is turned on and/or an openable and closable cover to be opened or closed at the time of replacing the image creation device loaded in an exchangeable manner with a new one is closed;

initiating common-processing including all of image stabilization processing for old image creation devices to maintain image quality with respect to old image creation devices and a part of image stabilization processing for brand-new image creation devices to maintain image quality with respect to brand-new image creation devices before it is discriminated whether the image creation device is a brand-new image creation device or an old image creation device; and executing image stabilization processing peculiar to brand-new image creation devices depending on a discrimination result after completion of the common-processing.

According to a fifth aspect of the preferred embodiment of the present invention, an image forming apparatus, comprises:

an image creation device loaded in the image forming apparatus in a replaceable manner;

a detector that detects loading or unloading of the image creation device;

a new/old discriminating portion that discriminates whether the image creation device is a brand-new image creation device or an old image creation device which has been already loaded and used;

an image stabilization manager that executes image stabilization processing for old image creation devices to maintain image quality with respect to old image creation devices and executes image stabilization processing for brand-new image creation devices including at least a part of the image stabilization processing for old image creation devices as common-processing to maintain image quality with respect to brand-new image creation devices; and a controller that makes the new/old discrimination portion initiate new/old discrimination processing for discriminating whether the image creation device is a brand-new image creation device or an old image creation device which has been already loaded and used when power supply is turned on and/or when it is detected that the image creation device is loaded, makes the image stabilization processing manager initiate common-processing common to image stabilization processing for old image creation devices and image stabilization processing for new image creation devices before it is discriminated whether the image creation device is a brand-new image creation device or an old image creation device which has been already loaded and used, and makes the image stabilization processing manager execute image stabilization processing peculiar to brand-new image creation devices after completion of the common-processing in cases where it is discriminated by the new/old discrimination portion that the image creation device is a brand-new image creation device.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
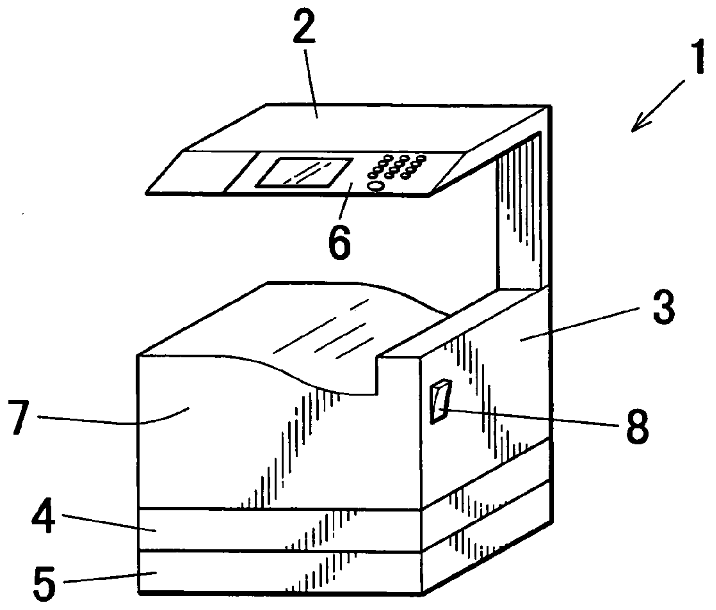
FIG. 1 is a perspective view showing an embodiment of an image forming apparatus according to the present invention.
Figure 2:
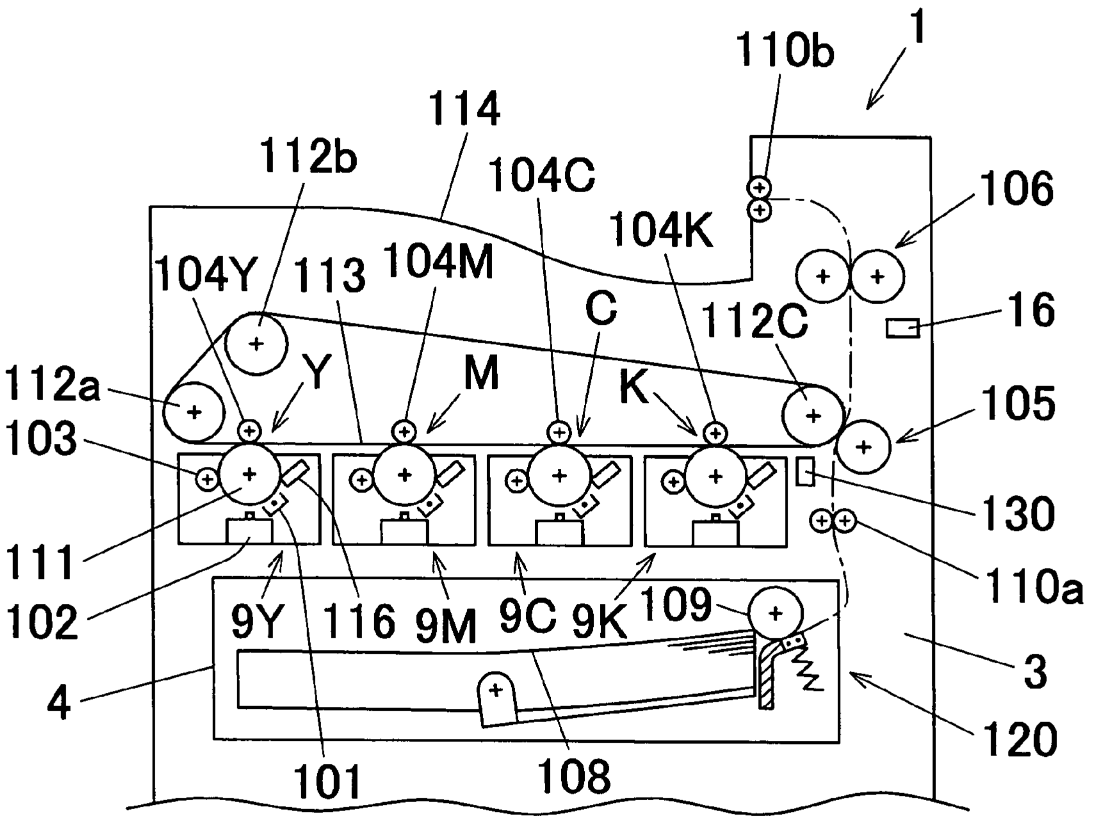
FIG. 2 is a schematic view showing a cross-sectional structure of the image forming apparatus.

FIG. 1 is a schematic view of a printer 1 as an image forming apparatus according to an embodiment of the present invention, and FIG. 2 is a cross-sectional structural view showing the printer 1.

As shown in FIG. 1, the printer 1 has a scanner portion 2 for scanning an original document and a printer main body 3 for forming an image based on original image data scanned by the scanner portion 2 or print data transmitted from each terminal (not shown) via a LAN or the like (not shown).

The scanner portion 2 is a scanner of a known type in which light is irradiated to an original document from a light source and the reflected light is photoelectrically converted into electronic signals by a CCD image sensor. The obtained electronic signals are converted into image data by a controller (not shown) controlling the entire printer.

The printer main body 3 is a type of forming an image on a paper or a sheet by an electro-print method. In this embodiment, the printer main body 3 is equipped with paper feeding trays 4 and 5 capable of storing papers different in size. Each paper feeding tray 4 and 5 is provided with a paper detecting sensor (not shown) for detecting papers.

At the front portion of the scanner portion 2, an operation panel 6 having a liquid crystal displaying device and a transparent touch panel formed on the displaying device.

As shown in FIG. 2, the printer 1 is provided with image creation devices 9Y, 9M, 9C and 9K, which are process cartridges detachably loaded in an exchangeable manner respectively and disposed at image forming stations Y, M, C and K for forming colors, i.e., yellow, magenta, cyan and black respectively, loaded approximately at the central portion of the printer main body 3. Each image creation device 9Y, 9M, 9C and 9K is provided with, as a structural element for executing image forming processing, a photosensitive drum 111, a charger 101, an exposing device 102 including a light-emitting diode (LED), a developing device 103 and a cleaner 116 for cleaning the photosensitive drum surface. The charger 101, the exposing device 102, the developing device 103 and the cleaner 116 are disposed around the photosensitive drum 111. Furthermore, each image forming device 9Y, 9M, 9C and 9K is provided with a toner container (not shown) for supplying toner of a corresponding color (yellow, magenta, cyan, and black) to the built-in developing device 103. The developing device 103 of each image forming device 9Y, 9M, 9C and 9K is integrally provided with an ATDC (automatic toner density controller) sensor (not shown) for sensing the toner density to automatically control the toner density in the toner container. The photosensitive drum 111 of each image creation device 9Y, 9M, 9C and 9K is disposed so as to face to the first transferring rollers 104Y, 104M, 104C and 104K via an intermediate transferring belt 113 supported by rollers 112*a*, 112*b* and 112*c*.

At the lower portion of the printer main body 3, a paper feeding/conveying portion 120 is provided. This paper feeding/conveying portion 120 feeds, for example, a paper 108 stored in the paper feeding tray 4 (in this explanation, the paper feeding tray 5 will be neglected to simplify the explanation) one by one with the paper feeding roller 109 and conveys the paper to the transferring portion 105 via the conveying rollers 110*a*.

At each color image forming station Y, M, C and K, the charger 101 evenly charges the surface of the photosensitive drum 111. Subsequently, the exposing device 102 forms a latent image on the photosensitive drum 111 by emitting light from the light-emitting diode (LED) based on image data. The developing device 103 forms (develops) a toner image by making toner supplied from the toner container adhere to the latent image formed on the photosensitive drum 111. The first transferring roller 104 initially transfers the toner image formed on the photosensitive drum 111 onto the intermediate transferring belt 113 driven the rollers 112*a*, 112*b* and 112*c*. The second transferring roller 105*a* secondary transfers the toner image on the intermediate transferring belt 113 onto the paper 108 conveyed by the conveying rollers 110*a*. The paper on which the toner image is transferred will be conveyed to the fixing and paper discharging portion 106 provided at the upper portion of the printer main body 3.

The fixing and paper discharging portion 106 fixes the toner image transferred onto the paper 108 and discharges the paper (print) on which the image is fixed onto the paper discharging tray 114 formed on the upper surface of the printer main body 3 via the conveying rollers 110*b*.

In the vicinity of the roller 112*c* supporting the intermediate transferring belt 113, an AIDC (automatic image density controller) sensor 130 capable of sensing the density of each color transferred onto the intermediate transferring belt 113 is provided. This AIDC sensor 130 is used to execute various image stabilization processing which will be mentioned later.

At the front portion of the printer main body 3, an openable-and-closable front cover 7 (see FIG. 1) is provided. By opening this front cover, each image creating device 9Y, 9M, 9C and 9K can be replaced with a new one. The open/close state of the front cover 7 is detected by a cover open/close detection sensor 16.

At the side surface of the printer main body 3, a power switch 8 (see FIG. 1) is provided.

Figure 3:
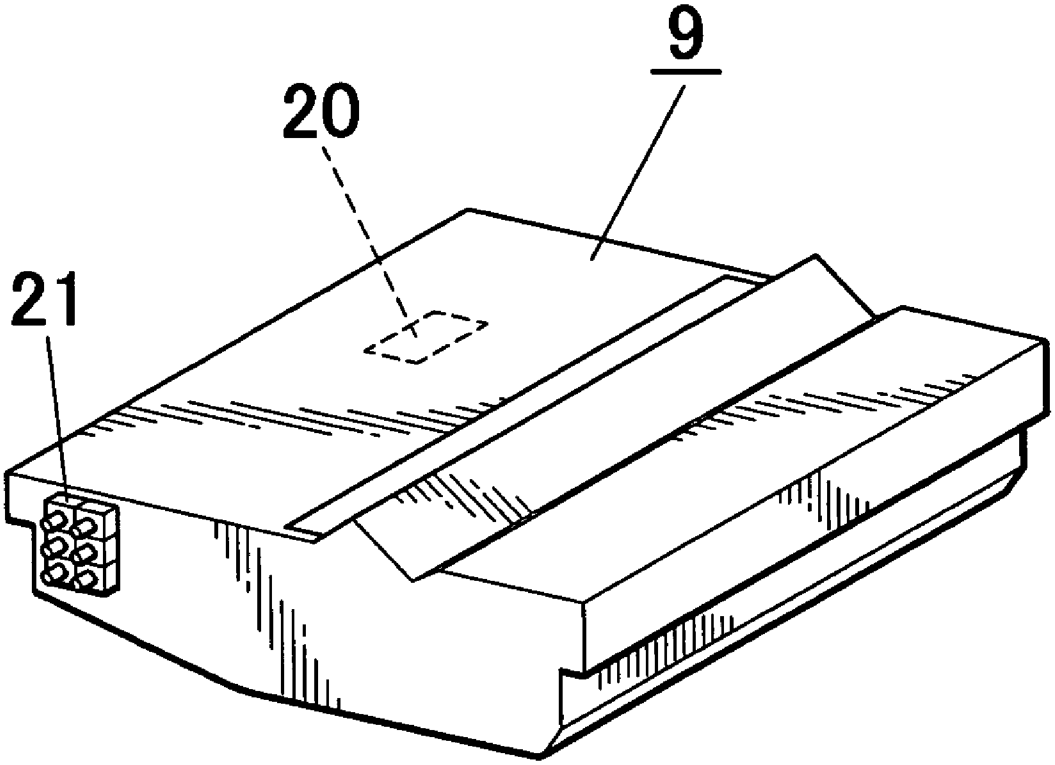
FIG. 3 is a perspective view showing an image creating device to be loaded in the image forming apparatus.

FIG. 3 is a perspective view showing the image creation device 9 ("9" is a generic reference numeral of 9Y, 9M, 9C and 9K). This image creation device 9 is a unit device formed by integrating a photosensitive drum 111, a charger 101, an exposing device 102, a developing device 103 and a cleaner 116. The image creating device 9 has a built-in EEPROM (Electronically Erasable and Programmable Read Only Memory) 20 as a nonvolatile memory and a data transferring connector 21 provided at the side surface of the image creating device 9. When this image creation device 9 is loaded in the printer main body 3, the connector 21 of the image creation device 9 will be connected to a connector (not shown) provided in the printer main body 3. Thus, the information regarding whether the image creation device 9 is new or old, which is written in the nonvolatile memory 20 of the image creation device 9, will be read.

Figure 4:
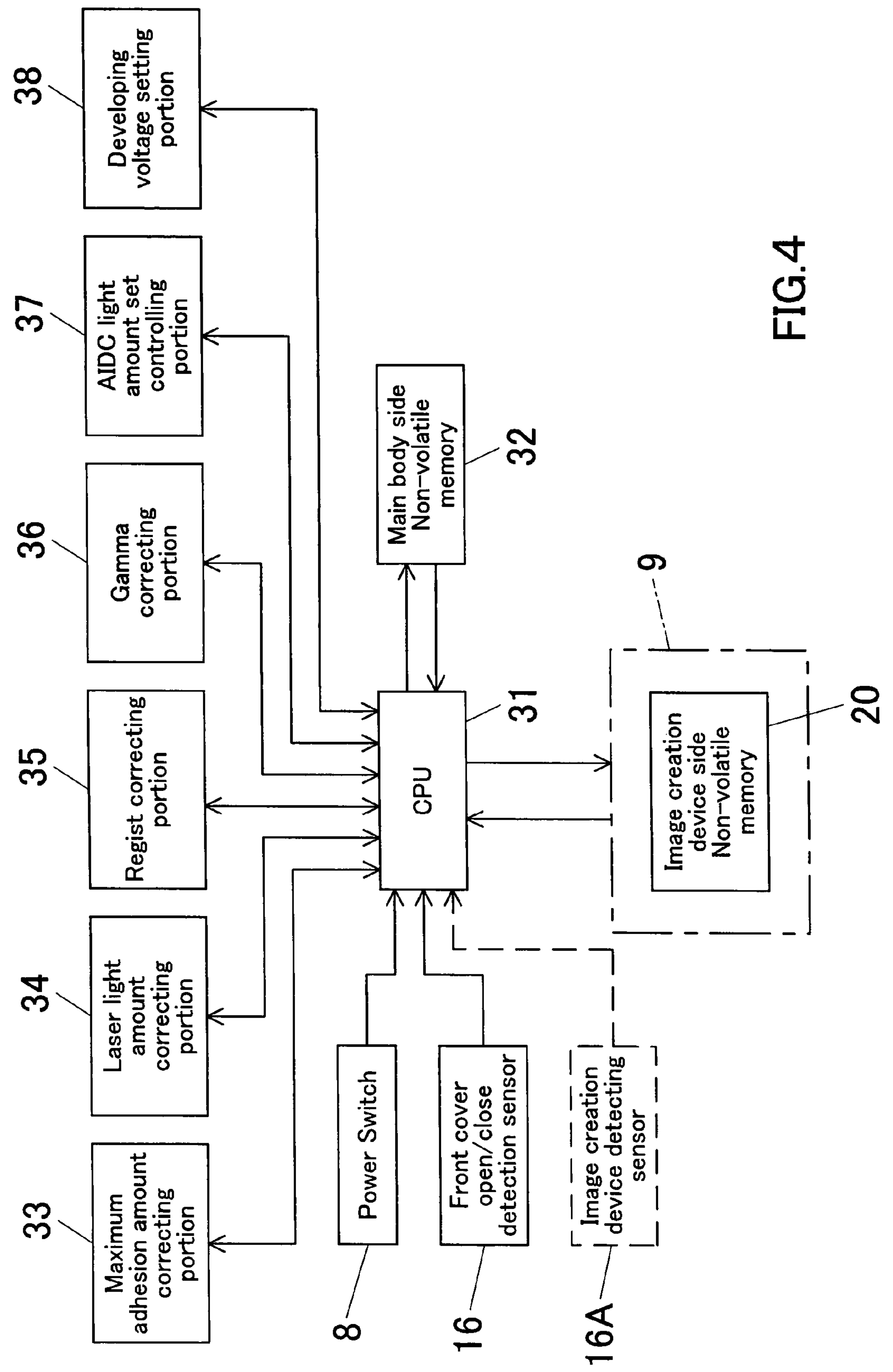
FIG. 4 is a block diagram showing a control system for controlling the image creation device.

FIG. 4 is a block diagram showing a control system of the printer 1 for executing image stabilization processing of the image creation device 9.

In FIG. 4, reference numeral "9" denotes the image creation device, "20" denotes the nonvolatile memory built-in the image creation device 9. FIG. 4 shows an image creation device 9 as a representative of each color image creation device.

Reference numeral "31" denotes a CPU, "32" denotes a nonvolatile memory in the printer main body 3. This CPU 31 discriminates whether the image creation device 9 is new or old and executes image stabilization processing for the image creation device 9 when the power switch 8 is turned on or when it is detected by the front cover open/close detection sensor 16 that the front cover 7 is closed.

As for the difference between the "new" (image creation) device (unit)" and the "old" (image creation) device (unit), it is generally construed such that a "new" (image creation) device (unit) denotes a device (unit) which has never been used (i.e., the so-called brand-new device (unit)) and an "old" (image creation) device (unit) denotes a device (unit) which has been installed at least once in an apparatus such as a copying machine and has been executed, e.g., image stabilization processing (i.e., the so-called used device (unit)). However, in this invention, the meanings of the aforementioned wordings are not limited to the above. For example, depending on characteristics of an apparatus, such as a copying machine, in which a device (unit) is installed, an "old" (image creation) device (unit) may also denote a device (unit) which has been already used and will be continuously used, and a "new" (image creation) device (unit) may also denote a device (unit) which has been newly installed in an apparatus such as a copying machine (accordingly, it is not always a brand-new device (unit), but may be a used device (unit)).

The aforementioned discrimination of the image creation device 9 is performed as follows. As mentioned above, information regarding the image creation device itself is written in the nonvolatile memory 20 in the image creation device 9, and the CPU 31 reads contents of the information to perform the discrimination. The discriminated result will be written and stored in the nonvolatile memory 32 provided in the printer main body 3.

Returning to FIG. 4, reference numeral "33" denotes a maximum adhesion amount correcting portion, "34" denotes a laser light amount correcting portion, "35" denotes a regist correcting portion, "36" denotes a gamma correcting portion, "37" denotes an AIDC light amount set controlling portion, and "38" denotes a developing voltage setting portion. These portions are configured to execute maximum adhesion amount correcting processing, laser light amount correcting processing, regist correcting processing, gamma correcting processing, AIDC light amount set controlling processing, and developing voltage setting processing, which are examples of the image stabilization processing for the image creation device 9.

The maximum adhesion amount correcting processing is performed to correct the toner amount of the raw image (all pixel exposure 255 gradations) to be transferred onto the intermediate transferring belt 113 to a targeted amount. Concretely, a raw patch is created every color and detected by the AIDC sensor 130 to set the development duty to be used at the time of printing. This maximum adhesion amount correcting processing is necessary regardless whether the image creation device 9 is new or old. However, in cases where the image creation device 9 is old, since it is possible to utilize the numeral value (stored in the nonvolatile memory 32 equipped in the printer main body) created at the time of the previous correction, the number of raw patches to be created can be less than that of the raw patches to be created in cases where the image creation device 9 is new. Accordingly, the contents of the maximum adhesion amount correcting processing are different between a new image creation device and an old image creation device. Thus, the maximum adhesion correcting processing for old image creation devices can be simple.

The laser light amount correcting processing is performed to correct fluctuation of thin line reproducibility or white-out reproducibility, which will be generated due to each fluctuation of photosensitive drum electrostatic characteristics, development characteristics and transfer characteristics, to a targeted level. Concretely, a toner patch is created every color, and the color is detected by the aforementioned AIDC sensor 130 to thereby obtain the laser light amount to be used at the time of printing. This laser light amount correcting processing is also necessary regardless whether the image creation device 9 is new or old. However, in cases where the image creation device 9 is old, since it is possible to utilize the numeral value (stored in the nonvolatile memory 32 equipped in the printer main body) created at the time of the previous correction, the number of toner patches to be created can be less than that of toner patches to be created in cases where the image creation device is new. Accordingly, contents of the laser light amount correcting processing are different between a new image creation device and an old image creation device. Thus, the laser light amount correcting processing for old image creation devices can be simple.

The regist correcting processing is performed to correct color shifts generated due to dispersion and/or fluctuation of print position of each color regardless of the control thereof in the printer main body 3. Concretely, a certain pattern of each color is created and the color shift amount thereof is detected. Then, this color shift is corrected. This regist correcting processing is also necessary regardless whether the image creation device 9 is new or old. However, in cases where the image creation device 9 is old, since it is possible to utilize the numeral value (stored in the nonvolatile memory 32 equipped in the printer main body) created at the time of the previous correction, the number of patterns to be created can be less than that of patterns to be created in cases where the image creation device 9 is new. Accordingly, the contents of the regist correcting processing are different between a new image creation device and an old image creation device. Thus, the regist correcting processing for old image creation devices can be simple.

The gamma correcting processing is processing in which a 256 gradation pattern of each color is created, the pattern is detected by the AICD sensor 130, the gradation characteristics to be outputted from the current image creation device is calculated based on the detected result, and the result is reflected to the gamma processing. If this gamma correcting processing is performed once, the characteristic value can be used thereafter. Accordingly, this processing is performed only to a new image creating device 9.

If the developing voltage is too high with respect to the developing portion of the image creation device 9, a leak image generates. On the other hand, if the developing voltage is too low, the reproducibility of half tone deteriorates. Accordingly, the aforementioned developing voltage setting processing is performed to detect a developing voltage area which does not generate both image noises and set an appropriate developing voltage. A developing voltage is amenable to effects of environment and effects of an image creating device with time, and therefore it is necessary to perform the developing voltage setting processing every time the image stabilization processing is performed. However, the contents of processing is the same regardless whether the image creation device 9 is new or old, i.e., the aforementioned developing voltage setting processing is processing common to both a new image creation device and an old image creation device.

The aforementioned AIDC light amount control processing is performed to adjust the sensor LED light amount so as to make the output of the AIDC sensor 130 constant. That is, various characteristic fluctuation in the AIDC sensor 130 due to, e.g., the changes with time, individual differences and environmental changes, affects the bare surface output of the intermediate transferring belt 113. Therefore, the output of the AIDC sensor 130 is corrected so as to be constant. Concretely, a pattern is created at a light amount of a certain level, and the pattern is read with the AICD sensor 130. Then, based on the voltage, the sensor LED light amount is adjusted. As mentioned above, this AIDC sensor 130 becomes a benchmark of, e.g., each image stabilization processing, and therefore the AIDC light amount control processing is required to perform every image stabilization processing. It is necessary to perform the AIDC light amount control processing every time the image stabilization processing is performed since the AIDC sensor 130 becomes a standard for each image stabilization processing. However, the AIDC light amount control processing does not depend on whether the image creating device 9 is old or new, and therefore, the AICD light amount control processing is common-processing common to both a new image creation device and an old image creation device.

The contents of the image stabilization processing as explained above can be summarized in Table 1. In Table 1, “Full” denotes processing performed from the initial state, and “Simple” denotes simple processing performed by utilizing the previous state.

TABLE 1

| Status of Image Creation Device | Processing peculiar to new devices | Processing peculiar to old devices | Common-processing common to new and old devices |
|---|---|---|---|
| Necessary image stabilization processing | Maximum adhesion amount correction (full)<br>Laser light amount correction (full)<br>Regist correction (full)<br>Gamma correction | Maximum adhesion amount correction (simple)<br>Laser light amount correction (simple)<br>Regist correction (simple) | AIDC light amount set control<br>Developing voltage setting |

Next, the contents of the image stabilization execution controlling processing will be explained with reference to the flowchart shown in FIG. 5. In the following explanation and drawings, “Step” will be abbreviated as “S.”

In this embodiment, this control processing is activated every time the power switch 8 is turned on and when the cover open/close detection sensor 16 detects the closing of the front cover 7.

The reason why the control processing is performed every time the cover open/close detection sensor 16 detects the closing of the front cover 7 is that there is a possibility of replacement of the image creation device 9 with a new one when the front cover 7 is opened and closed.

As mentioned above, in this embodiment, it is indirectly discriminated by the open/close operation of the front cover that a replacement, loading or unloading of the image creation device 9 is detected. However, as shown in FIG. 4, a sensor 16A for sensing the loading/unloading of the image creation device 9 can be employed.

Figure 5:
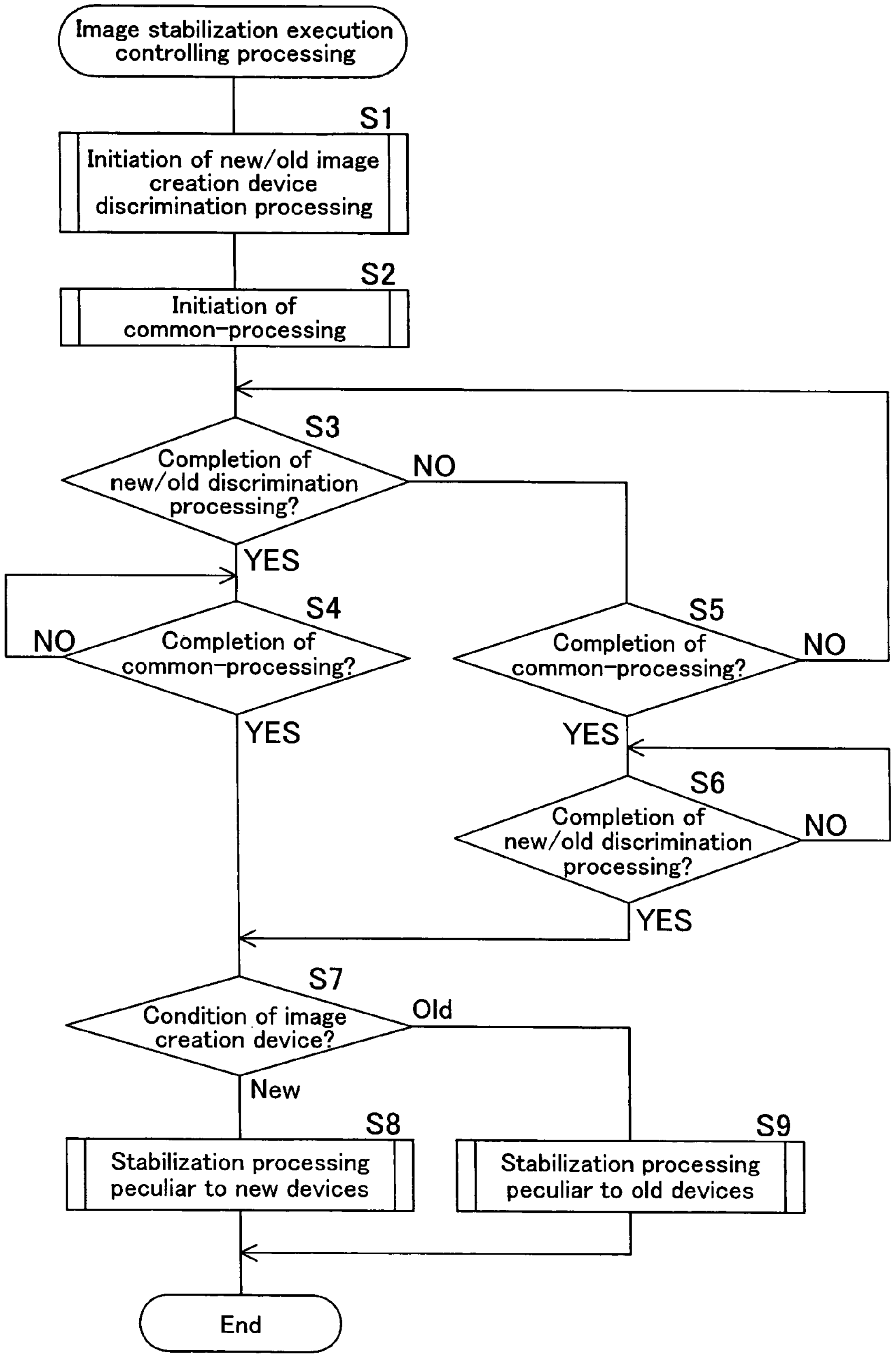
FIG. 5 is a flowchart showing a content of image stabilization execution control processing to be executed by a CPU shown in FIG. 4.

In FIG. 5, at S1, the CPU 31 initiates discrimination on whether the image creation device 9 is new or old. This discrimination is performed by reading the information stored in the nonvolatile memory 20 of the image creation device 9 with the CPU 31. The result will be written and stored in the nonvolatile memory 32 of the printer main body 3.

After the initiation of the discrimination at S1, common-processing for stabilizing an image common to old and new image creation devices 9 is initiated at S2. Subsequently, the routine proceeds to S3. At S3, it is discriminated whether the common-processing for the image creation device 9 initiated at S1 is completed. If completed (Yes at S3), the routine proceeds to S4. To the contrary, if not completed (No at S3), the routine proceeds to S5.

At S4, it is discriminated whether the common-processing initiated at S2 is completed. If not completed (No at S4), the routine waits until the completion. However, if completed (Yes as S4), since both the new/old discrimination processing and the common-processing are completed, the routine proceeds to S7.

On the other hand, at S5, it is discriminated whether the common-processing is completed. If not completed (No at S5), the routine returns to S3 to again discriminate whether the new/old discrimination processing for the image creation device 9 is completed. If the common-processing is completed at S5 (Yes at S5), since the common-processing is completed prior to the new/old discrimination processing, the routine proceeds to S6 to wait for the completion of the new/old discrimination processing (No at S6). When the new/old discrimination processing is completed at S6 (Yes at S6), since both the common-processing and the new/old discrimination processing are completed, the routine proceeds to S7.

At S7, the status of the image creation device 9 discriminated by the new/old discrimination processing is checked. If it is discriminated that the image creation device 9 is new, the routine proceeds to S8 to execute the image stabilization processing peculiar to new image creation devices. Furthermore, if it is discriminated that the image creation device 9 is old, the routine proceeds to S9 to execute the image stabilization processing peculiar to old image creation devices.

Figure 6:
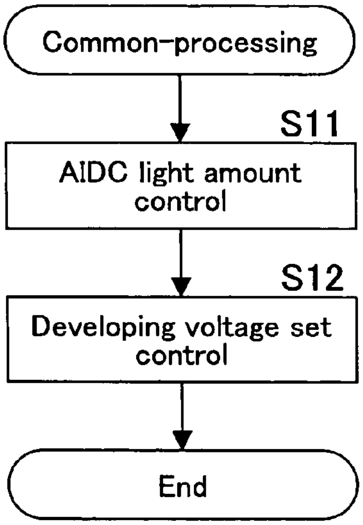
FIG. 6 is a flowchart showing common image stabilization processing procedures.

FIG. 6 shows the contents of the common-processing initiated at S2 shown in FIG. 5. As explained above, this common-processing makes the AIDC light amount setting controlling portion 37 and the developing voltage setting controlling portion 38 execute the AIDC light amount setting controlling processing (S11) and the develop voltage setting controlling processing (S12).

Figure 7:
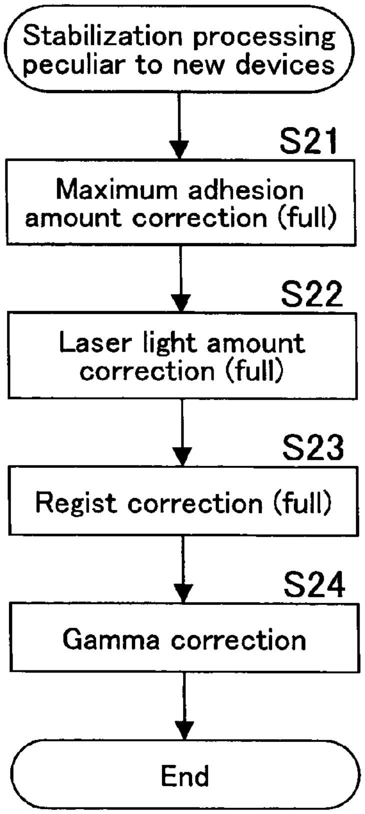
FIG. 7 is a flowchart showing image stabilization processing procedures specific to new devices.

FIG. 7 shows the contents of the image stabilization processing executed at S8 which is peculiar to new image creation devices. As explained above, this image stabilization processing makes the maximum adhesion amount correcting portion 33, the laser light amount correcting portion 34, the regist correcting portion 35 and the gamma correcting portion 35 execute processing of maximum adhesion amount correction (full) (S21), processing of laser light amount correction (full) (S22), processing of regist correction (full) (S23) and processing of gamma correction (S24), respectively.

Figure 8:
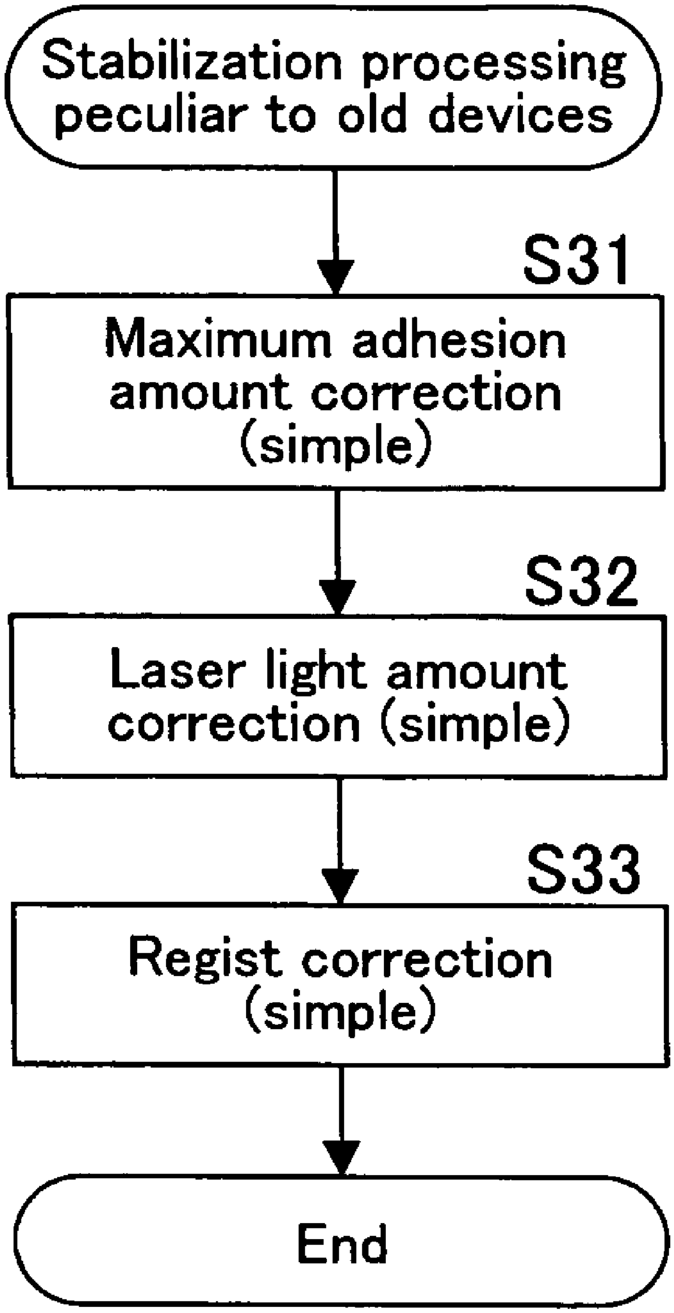
FIG. 8 is a flowchart showing image stabilization processing procedures specific to old devices.

FIG. 8 shows the contents of the image stabilization processing executed at S9 which is peculiar to the old image creation devices. As explained above, this image stabilization processing makes the maximum adhesion amount correcting portion 33, the laser light amount correcting portion 34 and the regist correcting portion 35 execute processing of maximum adhesion amount correction (simple) (S31), processing of laser light amount correction (simple) (S32) and processing of regist correction (simple) (S33), respectively.

As explained above, in this embodiment, before the new/old discrimination of the image creation device 9, the image stabilization processing which is common to new and old image creation devices is initially executed. Thereafter, depending on the discrimination result, the image stabilization processing peculiar to new image creation devices or to old image creation devices is executed. Accordingly, especially, regarding new image creation devices, it becomes possible to improve the efficiency of image stabilization processing as compared with conventional processing and also to shorten the processing time.

Figure 9:
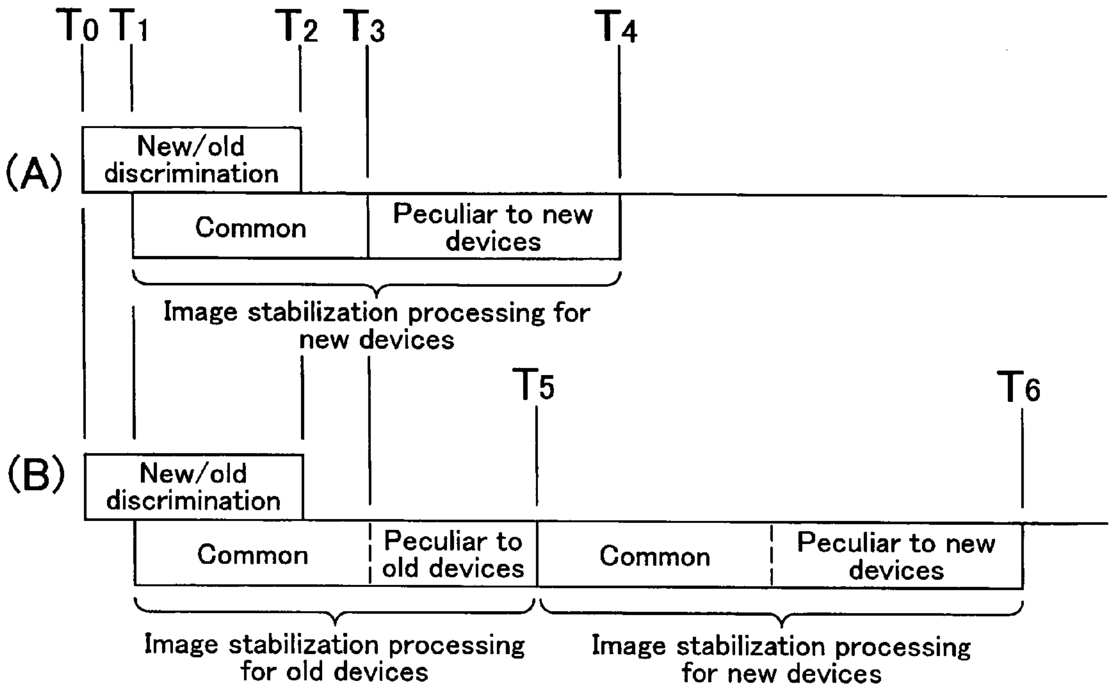
FIG. 9 is a timing chart for explaining effects of this embodiment.

The advantages of this embodiment can be explained with reference to the timing chart shown in FIG. 9 as follows.

In a conventional processing shown in FIG. 9(B), after the initiation of the new/old discrimination processing at the timing of T0, the image stabilization processing for old image creation devices which includes common-processing common to new and old image creation devices and processing peculiar to old image creation devices is initiated at the timing of T1. If it is discriminated that the image creation device 9 is new at the timing of T2, the image stabilization processing for new image creation devices will not be executed until the timing of T5 when the image stabilization processing for old image creation devices is completed. As a result, the initiation timing T5 for the image stabilization processing for new image creation devices was delayed. In addition, in executing the image stabilization processing for new image creation devices, the common-processing which had been already executed at the image stabilization processing for old image creation devices was executed again. Therefore, an additional processing time required for the common-processing was required. Thus, the stabilization processing was terminated at the timing of T6.

To the contrary, in the embodiment shown in FIG. 9(A), after the initiation of the new/old discrimination processing is initiated at the timing of T0, the new/old common-processing is initially initiated at the timing of T1. Then, at the timing of T3 which is a timing of the completion of the new/old common-processing, the stabilization processing peculiar to new image creation devices or old image creation devices will be executed. Accordingly, the timing of T3 for executing the image stabilization processing for new image creation devices becomes earlier than the conventional timing of T5 in cases where it is discriminated that the image creation device 9 is new. Furthermore, since the common-processing had been already executed, if only the image stabilization processing peculiar to new image creation devices is executed, all of the image stabilization processing for new image creation devices can be completed. Accordingly, the processing time can be shortened since the overlapped common-processing can be omitted. Thus, the processing can be completed at the timing of T4 earlier than the conventional completion timing T6.

Although one embodiment of the present invention is explained, the present invention is not limited to the above embodiment. For example, all of a part, not a part, of the image stabilization processing for old image creation devices and a part image stabilization processing for new image creation devices can be common-processing. In this case, since no image processing stabilization processing peculiar to old image creation devices exists, if it is discriminated that the device is old, a step for executing the image stabilization processing peculiar to old image creation devices (S9 in FIG. 5) will be no longer required.

Furthermore, the aforementioned explanation is directed to a case in which the image stabilization execution controlling processing is initialized every time the power switch 8 is turned on or every time the front cover open/close detection sensor 16 detects that the front cover 7 is closed. However, the image stabilization execution control processing can be performed in either when the power switch 8 is turned on or when the front cover open/close detection sensor 16 detects that the front cover is closed.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image forming apparatus, comprising:

an image creation device loaded in the image forming apparatus in a replaceable manner;

an openable and closable cover configured to be opened and closed when the image creation device is to be replaced with a new one;

a discrimination device that discriminates whether the image creation device is a new image creation device or an old image creation device which has been already loaded and used;

an image stabilization processing portion that executes image stabilization processing for old image creation devices to maintain image quality with respect to old image creation devices and also executes image stabilization processing for new image creation devices including a part of the image stabilization processing for old image creation devices as common-processing to maintain image quality with respect to new image creation devices; and a controller that makes the discrimination device initiate discrimination processing when at least one of a power supply is turned on and the openable and closable cover is closed, makes the image stabilization processing portion initiate common-processing common to image stabilization processing for old image creation devices and image stabilization processing for new image creation devices before it is discriminated that the image creation device is a new image creation device or an old image creation device, and makes the image stabilization processing portion initiate image stabilization processing peculiar to new image creation devices or old image creation devices depending on a discrimination result of the discrimination portion after completion of the common-processing.

2. The image forming apparatus as recited in claim 1, wherein the image stabilization processing peculiar to new image creation devices includes toner adhesion amount correction processing for optimizing a toner adhesion amount, laser light amount correction processing for optimizing a laser light amount, regist correction processing for correcting color shift of each color, and gamma correction processing for correcting gradation characteristics.

3. The image forming apparatus as recited in claim 1, wherein the image stabilization processing peculiar to old image creation devices includes toner adhesion amount simple correction processing for optimizing a toner adhesion amount, laser light amount correction simple processing for optimizing a laser light amount, and regist correction simple processing for correcting color shift of each color.

4. The image forming apparatus as recited in claim 1, wherein the common-processing common to the image stabilization processing for old image creation devices and the image stabilization processing for new image creation devices includes developing voltage setting processing for determining a developing output capable of restraining noises and an AIDC light amount controlling processing for keeping an AIDC sensor output value constant.

5. The image forming apparatus as recited in claim 1, wherein discrimination by the discrimination device is executed based on information stored in a nonvolatile storing portion provided in the image creation portion.

6. An image forming apparatus, comprising:

an image creation device loaded in the image forming apparatus in a replaceable manner;

an openable and closable cover configured to be opened and closed when the image creation device is to be replaced with a new one;

a discrimination device that discriminates whether the image creation device is a new image creation device or an old image creation device which has been already loaded and used;

an image stabilization processing portion that executes image stabilization processing for old image creation devices to maintain image quality with respect to old image creation devices and executes image stabilization processing for new image creation devices including all of the image stabilization processing for old image creation devices as common-processing and image stabilization processing peculiar to brand-new image creation devices to maintain image quality with respect to new image creation devices; and a controller that makes the discrimination device initiate discrimination processing when at least one of a power supply is turned on and the openable and closable cover is closed, makes the image stabilization processing portion initiate the image stabilization processing for old image creation devices as the common-processing before it is discriminated that the image creation device is a new image creation device or an old image creation device, and makes the image stabilization processing portion execute the image stabilization processing peculiar to new image creation devices after completion of the image stabilization processing for old image creation devices in cases where it is discriminated that the image creation device is a new image creation device.

7. The image forming apparatus as recited in claim 6, wherein discrimination by the discrimination device is executed based on information stored in a nonvolatile storing portion provided in the image creation portion.

8. An image stabilization processing method for an image creation device loaded in an image forming apparatus, the method, comprising the steps of:

initiating discrimination processing for discriminating whether the image creation device is a new image creation device or an old image creation device which has been already loaded and used when at least one of a power supply is turned on and an openable and closable cover to be opened or closed at the time of replacing the image creation device loaded in a replaceable manner is closed;

initiating common-processing common to image stabilization processing for old image creation devices to maintain image quality with respect to old image creation devices and image stabilization processing for new image creation devices to maintain image quality with respect to the new image creation device before it is discriminated that the image creation device is a new image creation device or an old image creation device; and executing image stabilization processing peculiar to new image creation devices or old image creation devices depending on a discrimination result after completion of the common-processing.

9. An image stabilization processing method for an image creation device loaded in an image forming apparatus, the method, comprising the steps of:

initiating discrimination processing for discriminating whether the image creation device is a new image creation device or an old image creation device which has been already loaded and used when at least one of a power supply is turned on and an openable and closable cover to be opened or closed at the time of replacing the image creation device loaded in an exchangeable manner with a new one is closed;

initiating common-processing including all of image stabilization processing for old image creation devices to maintain image quality with respect to old image creation devices and a part of image stabilization processing for new image creation devices to maintain image quality with respect to new image creation devices before it is discriminated whether the image creation device is a new image creation device or an old image creation device; and executing image stabilization processing peculiar to new image creation devices depending on a discrimination result after completion of the common-processing.

10. An image forming apparatus, comprising:

an image creation device loaded in the image forming apparatus in a replaceable manner;

a detector that detects loading or unloading of the image creation device;

a discriminating device that discriminates whether the image creation device is a new image creation device or an old image creation device which has been already loaded and used;

an image stabilization manager that executes image stabilization processing for old image creation devices to maintain image quality with respect to old image creation devices and executes image stabilization processing for new image creation devices including at least a part of the image stabilization processing for old image creation devices as common-processing to maintain image quality with respect to new image creation devices; and a controller that makes the discrimination device initiate discrimination processing for discriminating whether the image creation device is a new image creation device or an old image creation device which has been already loaded and used when at least one of a power supply is turned on and when it is detected that the image creation device is loaded, makes the image stabilization processing manager initiate common-processing common to image stabilization processing for old image creation devices and image stabilization processing for new image creation devices before it is discriminated whether the image creation device is a new image creation device or an old image creation device which has been already loaded and used, and makes the image stabilization processing manager execute image stabilization processing peculiar to new image creation devices after completion of the common-processing in cases where it is discriminated by the discrimination device that the image creation device is a new image creation device.

11. The image forming apparatus as recited in claim 10, wherein discrimination by the discrimination device is executed based on information stored in a nonvolatile storing portion provided in the image creation portion.

12. The image forming apparatus as recited in claim 10, wherein the image stabilization processing peculiar to new image creation devices includes toner adhesion amount correction processing for optimizing a toner adhesion amount, laser light amount correction processing for optimizing a laser light amount, regist correction processing for correcting color shift of each color, and gamma correction processing for correcting gradation characteristics.

13. The image forming apparatus as recited in claim 10, wherein the image stabilization processing peculiar to old image creation devices includes toner adhesion amount simple correction processing for optimizing a toner adhesion amount, laser light amount correction simple processing for optimizing a laser light amount, and regist correction simple processing for correcting color shift of each color.

14. The image forming apparatus as recited in claim 10, wherein the common-processing common to the image stabilization processing for old image creation devices and image stabilization processing for new image creation devices includes developing voltage setting processing for deciding a developing output capable of restraining noises and an AIDC light amount control processing for keeping an AIDC sensor output value constant.

* * * * *

UNITED STATES PATENT AND TRADEMARK OFFICE
CERTIFICATE OF CORRECTION

PATENT NO. : 7,599,102 B2
APPLICATION NO. : 11/011086
DATED : October 6, 2009
INVENTOR(S) : Doi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1270 days.

Signed and Sealed this

Twenty-eighth Day of September, 2010

David J. Kappos
*Director of the United States Patent and Trademark Office*